United States Patent [19]
Miller

[11] Patent Number: 5,533,902
[45] Date of Patent: Jul. 9, 1996

[54] POCKET PANEL EDUCATIONAL OR DIAGNOSTIC TOOL

[76] Inventor: Sally E. Miller, 3000 E. Sunrise Blvd. 17c, Ft. Lauderdale, Fla. 33304

[21] Appl. No.: 226,065

[22] Filed: Apr. 11, 1994

[51] Int. Cl.$^6$ ................................................. G09B 21/00
[52] U.S. Cl. ...................... 434/112; 434/428; 434/430; 434/429; 434/156; 273/273
[58] Field of Search ................................. 434/112, 236, 434/258, 403, 428, 429, 430, 238, 156, 167, 168, 172, 159; 273/273; 40/159, 122, 594, 611, 618; 446/147, 901

[56] References Cited

U.S. PATENT DOCUMENTS

| | | | |
|---|---|---|---|
| 1,506,156 | 8/1924 | Björklund-Asperen | 434/429 |
| 3,316,669 | 5/1967 | Nachbar | 446/901 X |
| 3,808,709 | 5/1974 | Tozzi | 434/159 |
| 4,863,386 | 9/1989 | Maxey | 434/238 X |
| 4,915,632 | 4/1990 | Leff et al. | 434/112 |

Primary Examiner—Gene Mancene
Assistant Examiner—Jeffrey A. Smith
Attorney, Agent, or Firm—Nilles & Nilles

[57] ABSTRACT

A tool is usable as an educational tool, a diagnostic tool or a toy and is designed to develop or diagnose a user's matching, classifying, or labeling skills using primarily visual feedback and manual manipulation—skills possessed by even non-verbal students. The tool comprises one or more boards each of which may be handheld or may include devices for mounting the board on a wall, table, or another support. Each board is also constructed of a durable and preferably rigid material permitting significant rough handling by the user. Each board is composed of at least one panel, and typically two or more panels each of which presents at least one work area having a target and a pocket mounted thereon. The user's matching or classifying skills are ascertained and/or developed by inserting cards in pockets bearing characters matching those borne by the associated targets. The boards may be foldable or combinable so as to vary the number of targets involved in the matching, classifying, or labeling task. The targets may also be replaceable so as to permit variations in complexity of the target characters and thus in the complexity of the matching, classifying, or labeling tasks.

22 Claims, 5 Drawing Sheets

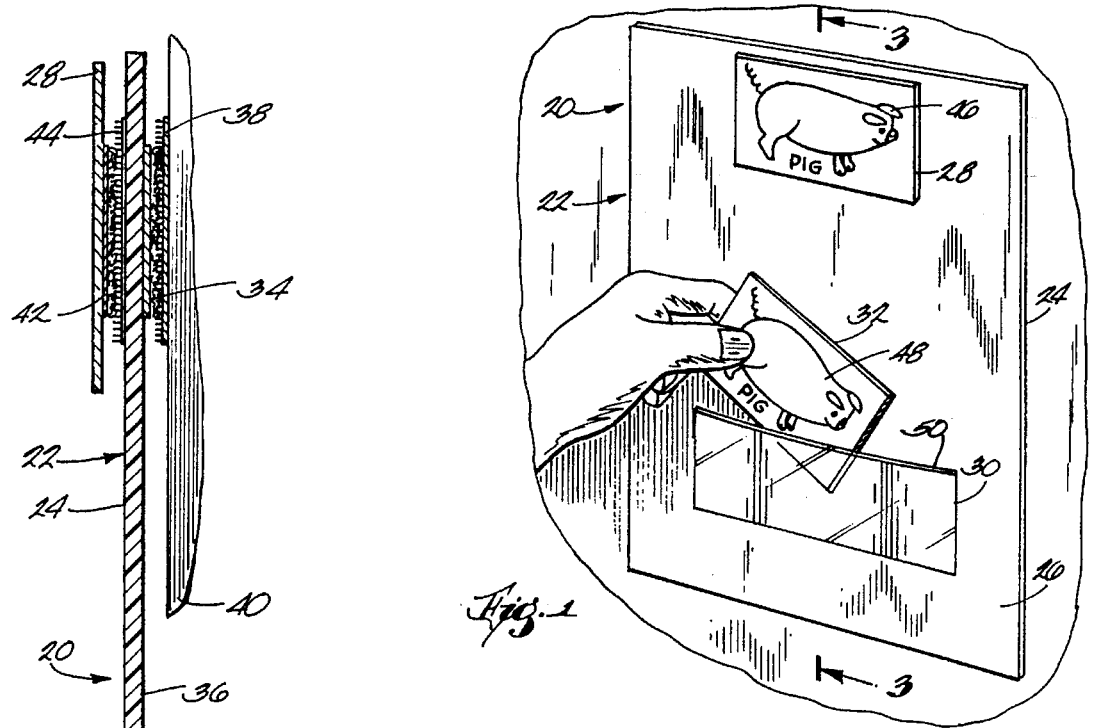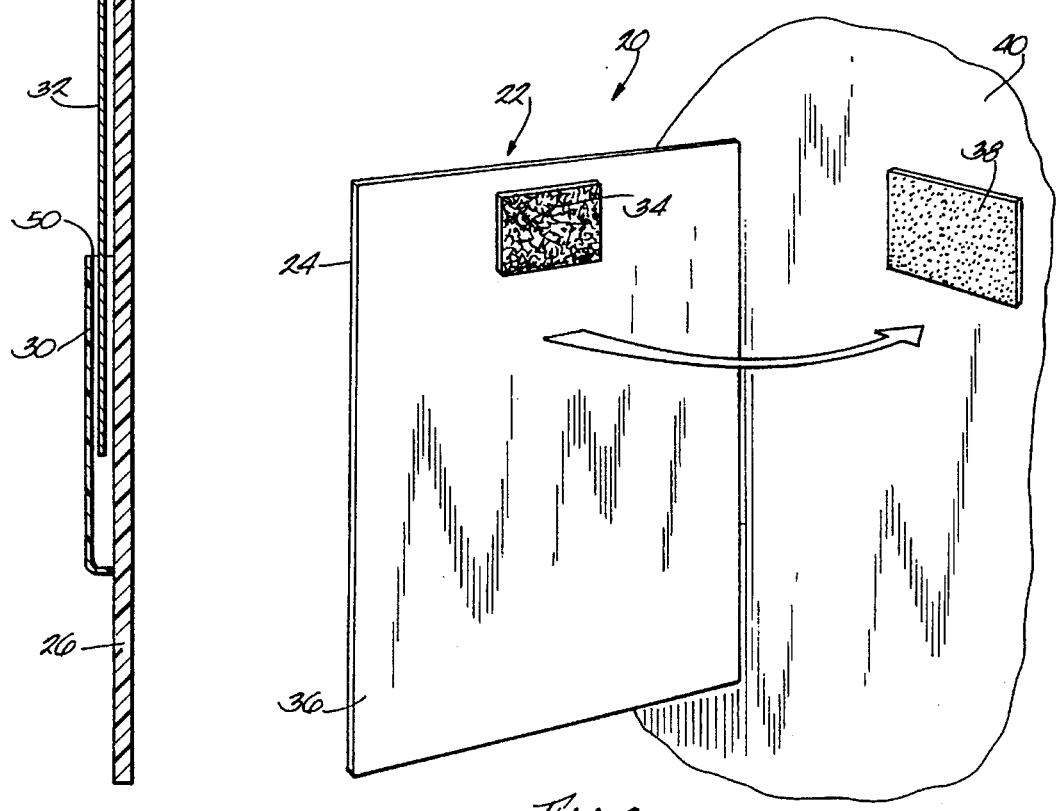

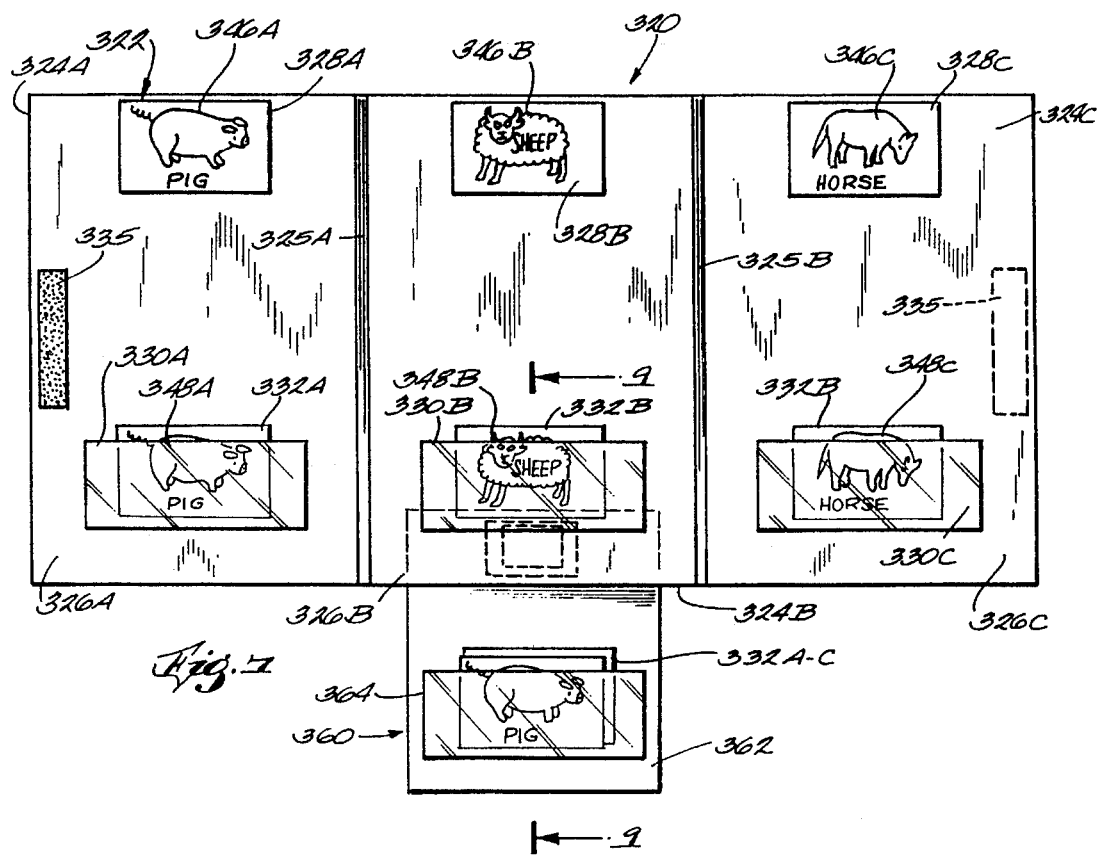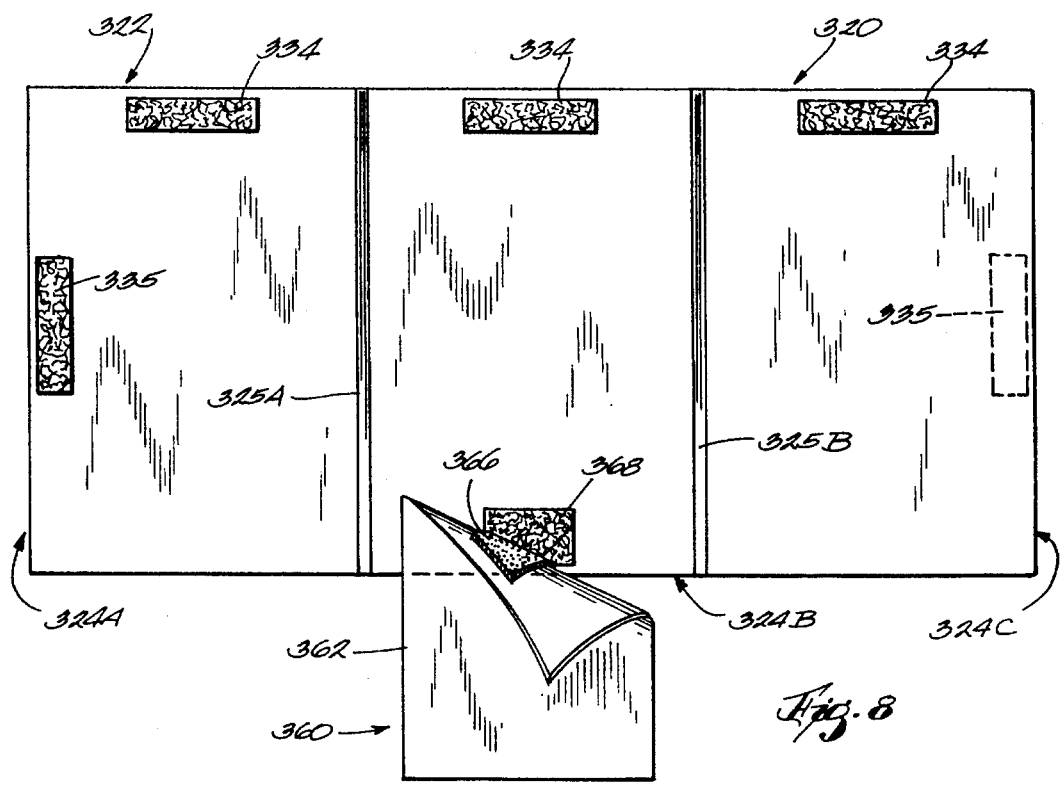

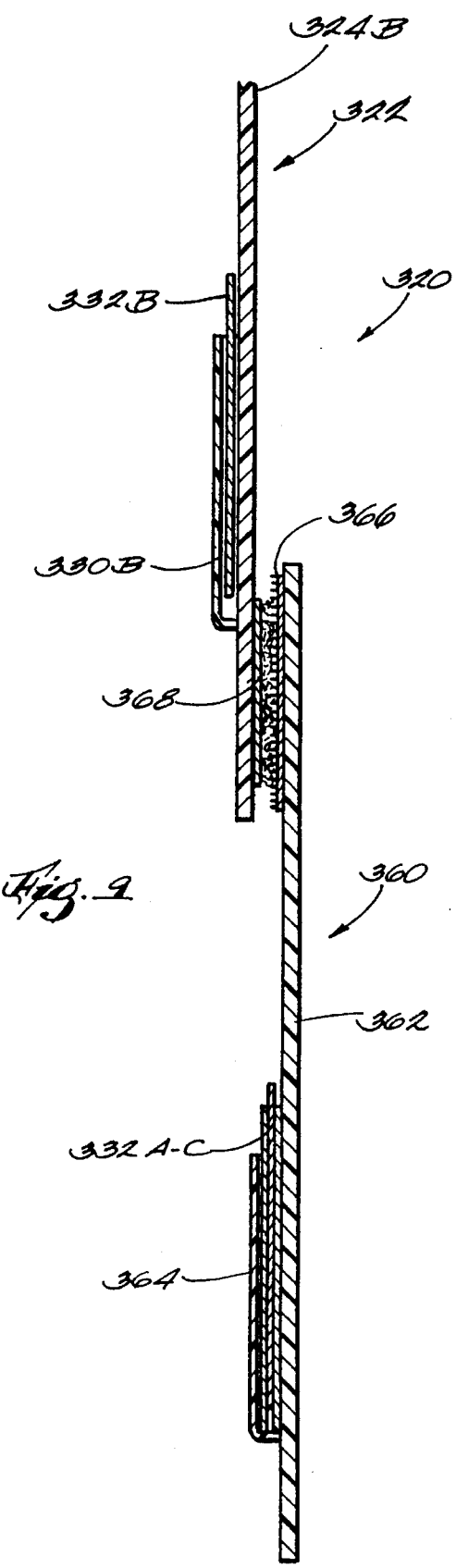

POCKET PANEL EDUCATIONAL OR DIAGNOSTIC TOOL

BACKGROUND OF THE INVENTION

1. Field of the Invention

The invention relates to educational or diagnostic tools or games and, more particularly, relates to tools for evaluating or enhancing the matching, classifying, and/or labeling skills of very young children, autistic children, or other children with verbal communication limitations requiring physical and verbal cues to help them master information.

2. Discussion of the Related Art

All children acquire new information in various stages and at varying rates. Common to all children is the acquisition of at least a limited ability to match, classify, and label new information, and the subsequent integration of such information in their lives in a way in which it makes sense to them.

Young children with speech, language and other communication disorders go through the same stages of learning as all other children but often at a much slower pace. Such children often exhibit very low frustration thresholds, particularly when they are exposed to other children learning at faster rates. Frustration for these children is often increased by a lack of physical dexterity. Such children require educational tools that will assist and coach them so as to strengthen those skills which they already have while fostering independence. The best tools provide physical and visual cues to help them match, classify, and label information through simple physical manipulation of the tools and thus offer a distinct advantage to children who communicate best physically rather than verbally. Ideally, such tools should be adaptable to accommodate progress of individual students or to accommodate varying skill levels by making provision to vary the complexity of each task presented by the tool and/or by varying the number of tasks presented by the tool. Similar needs are presented with respect to diagnostic tools, i.e., the ideal diagnostic tool permits accurate testing of a student's matching, labeling, or classifying skills (1) using skills already possessed by such a student (2) without unnecessarily surpassing the student's frustration threshold.

Educational and/or diagnostic tools exhibiting one or more (but not all) of the above characteristics are widely distributed. One such series of tools, marketed by Watten/Poe Teaching Resource Center, presents calendars, charts, and graphs for use by students. Each such tool comprises a substrate on which is mounted one or more rows and/or columns of pockets. Each of the pockets is designed to receive cards bearing characters such as shapes, colors, numbers, etc. The student is assigned with the task of inserting the appropriate card in each of the pockets in order to enhance his or her communication skills. Such tools, while adequate for their purpose, are typically not well adapted for enhancing or evaluating matching classifying, or labeling skills because they typically do not provide a target serving as a basis for comparison for matching purposes. Moreover, the substrate on which the transparent pockets are mounted is typically rather filmsy and poorly suited for physical punishment which may be imposed on the tool by students having limited dexterity or students who became frustrated and lash out or otherwise mishandle the tool. Such tools also usually have a set format and cannot be readily adapted for different purposes such as classifying or matching different numbers of characters or advancing from relatively simple classification or matching tasks to more complex tasks.

OBJECTS AND SUMMARY OF THE INVENTION

It is therefore an object of the invention to provide an educational or diagnostic tool which permits the evaluation and/or enhancement of a student's ability to match, classify, or label items using visual recognition and manual manipulation skills possessed even by students lacking verbal communication skills.

In accordance with a first aspect of the invention, this object is achieved by providing an instructional or diagnostic tool comprising a board including a panel. The panel has a front face presenting a work area in which is mounted a target bearing a character and a pocket for receiving cards bearing characters which match the character borne by the target.

Another object of the invention is to provide an educational or diagnostic tool of the type described above which is sufficiently sturdy to withstand use by students with limited dexterity or who are otherwise likely to mishandle the tool.

In accordance with another aspect of the invention, this object is achieved by forming the panel from a sturdy, durable material, preferably a rigid plastic.

Still another object of the invention is to provide an educational or diagnostic tool of the type described above which can be readily adapted or modified to vary the complexity of the matching or classification tasks presented by the tool and/or to vary the number of characters being matched, classified, or labeled.

In accordance with another aspect of the invention, this object is achieved by using a target which is replaceably attached to the panel, e.g., by hook-and-loop fasteners, and/or by employing a board having multiple work areas each having a separate target and a separate pocket. The multiple work areas may be provided on a common panel and/or on multiple panels hingedly connected to one another. This latter construction permits the board to be closed for storage and also permits one or more of the panels to be hidden to reduce the effective number of work areas presented by the board, thereby reducing the number and complexity of the tasks presented. Multiple boards may also be connected to one another to increase the effective number of work areas, thereby increasing the number and complexity of the tasks presented.

Other objects, features, and advantages of the invention will become apparent to those skilled in the art from the following detailed description and accompanying drawings. It should be understood, however, that the detailed description and specific examples, while indicating preferred embodiments of the invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 1 is a front plan view of an educational or diagnostic tool constructed in accordance with the invention and illustrating a single-panel/single-work area embodiment of the invention;

FIG. 2 is a back plan view of the tool of FIG. 1;

FIG. 3 is a vertical sectional elevation view taken along the lines 3—3 in FIG. 1;

FIG. 7 is a front plan view of a three-panel/three-work area tool exemplifying a fourth embodiment of the invention;

FIG. 8 is a rear plan view of the embodiment of FIG. 7;

FIG. 9 is a sectional elevation view taken along the lines 9—9 in FIG. 7;

DETAILED DESCRIPTION OF THE PREFERRED EMBODIMENTS

1. Resume

Figure 4:
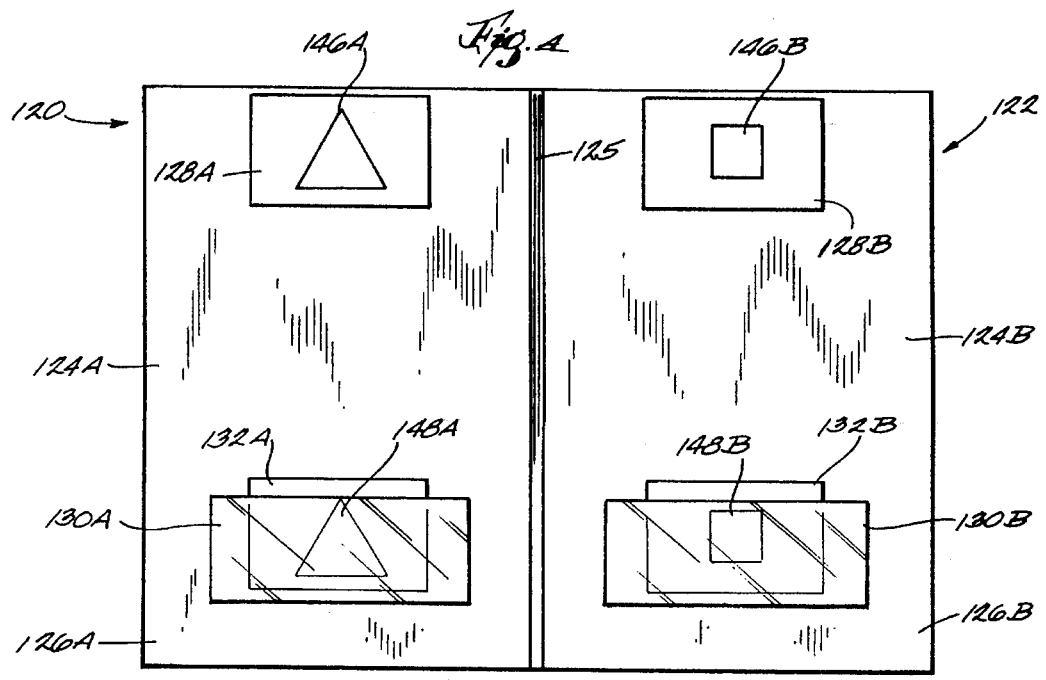
FIG. 4 is front plan view of a two-panel/two-work area tool exemplifying a second embodiment of the invention.

Pursuant to the invention, a device is provided which is usable as an educational tool, a diagnostic tool or a toy and which is designed to develop or diagnose a user's matching, classifying, or labeling skills using primarily visual feedback and simple manual manipulation—skills possessed by even non-verbal students. The tool comprises one or more boards each of which may be handheld or may include devices for mounting the board on a wall, table, or another support. Each board is constructed of a durable and preferably rigid material permitting significant rough handling by the user. Each board is composed of at least one panel, and typically two or more panels each of which presents at least one work area having a target and a pocket mounted thereon. The user's matching or classifying skills are evaluated and/or developed by inserting cards in pockets bearing characters matching those borne by the associated targets. The boards may be foldable or combinable so as to vary the number of targets involved in the matching, classifying, or labeling task. The targets may also be replaceable so as to permit variations in complexity of the target characters and thus in the complexity of the matching, classifying, or labeling tasks.

2. Overview and Construction and Use of the First Embodiment

Referring now to the drawings and to FIGS. 1–3 in particular, a tool 20 is illustrated which may be usable as either an educational tool, a diagnostic tool, or a toy. The tool 20 takes the form of a board 22 which in the illustrated case is formed from a single panel 24 the front face 26 of which presents a work area having a target or target card 28 and a pocket 30 mounted thereon. The board 22 is accompanied by a stack of character bearing sorting cards 32, only one of which is illustrated. The tool 20 permits evaluation or enhancement of a child's matching, classifying, or labeling skills by permitting the child to select sorting cards 32 from a stack and to insert into the pocket 30 those sorting cards 32 which bear a character matching the character borne by the target 28.

The panel 24 of the board 22 should be constructed from a relatively sturdy material capable of withstanding considerable abuse or mishandling by children. While durable pliable materials may be acceptable, a relatively rigid plastic is preferred for its dimensional stability. The panel 24 may be of any desirable size and preferably ranges in size from 5"×8" to 10"×12", depending upon the needs of a particular user. The board 22 may be handheld or, alternatively, may be designed for attachment to a table, wall, or other support. Should such an attachment be desired, one or more connectors such as a hook-and-loop fastener 34 may be provided on the rear face 36 of the panel 24 and connected to a mating connector 38 on a wall 40 or another suitable support as illustrated in FIGS. 2 and 3.

The target or target card 28 may comprise any suitable device capable of bearing a selected character. Preferably, the target 28, like the panel 24, should be formed from a relatively sturdy material and in the illustrated embodiment is formed from a rigid plastic. The target 28 is preferably detachably mounted on the panel 24 so as to permit replacement of a target 28 with targets bearing other characters for reasons detailed below. For instance, the target or target card 28 can be connected to the front face 26 of the panel 24 by hook-and-loop fasteners 42, 44 as illustrated, or could be inserted in a pocket much as the sorting cards 32 are inserted in pocket 30 as detailed below.

The characters 46, 48 on the target(s) 28 and sorting cards 32 may vary from relatively simple to relatively complex for reasons detailed below. For instance, the characters 46, 48 could comprise colors, geometric shapes, letters, animals as illustrated, or any other objects which are printed or etched on or otherwise borne by the target(s) 28 and cards 32 and are recognizable by the user and distinguishable from other objects for matching or classifying purposes. Such characters may be labeled as illustrated to enhance labeling skills and, at more advanced levels, may take the form of words only.

The pocket 30 is located in the work area of panel 24 at a position encouraging association of the pocket 30 with the target or target card 28 by the user, and is preferably located beneath the target 28 as illustrated. The pocket 30 is dimensioned so as to receive at least one and preferably several stacked cards 32 which are selected from a stack by a user and at least some of which bear a character 48 matching that borne by the target 28. The pocket 30 should be transparent so as to permit the user to continue to view the characters 48 after the sorting cards 32 are inserted into the pocket 30 and, in the illustrated embodiment, is formed from a sturdy transparent plastic material bonded or otherwise affixed to the front face 26 of the panel 24. The interior of the pocket 30 should be sufficiently thick and wide to permit easy insertion of sorting card(s) 32 and is preferably significantly shorter than the sorting cards 32 so as to permit the user to grasp the tops of the sorting cards 32 after they have been inserted into the pocket 30 without interference from the upper edge 50 of the pocket 30.

3. Use Of First Embodiment

The tool 20 may be used either as an educational tool, a diagnostic tool, or game or toy. When the tool 20 is used as an educational tool, a target or target card 28 bearing a specific character 46 is mounted on the panel 24 by the instructor. The user selects sorting cards 32 from a stack bearing characters 48 matching the character 46 on the target 28, and inserts these cards 32 into the pocket 30 as illustrated in FIG. 1. This selecting and subsequent insertion permits the user to develop his or her labeling, matching, or classifying skills using visual feedback and simple manual manipulation—skills present in even most non-verbal children.

The use of replaceable targets 28 permits the use of targets 28 and/or sorting cards 32 which accommodate the skill level of a particular student with each successive level requiring a progressively higher level of skill on the part of the student. Thus, if the task is to involve colors, four progressive skill levels could involve, e.g.: (1) the matching of a colored strip on the target with differently colored strips of identical shapes on the cards; (2) the matching of colored geometrical shapes; (3) the matching of colored objects; and (4) the matching of the words for colors, e.g. "red"and "blue". Similar hierarchies could be employed to match shapes, animals, or characters depicting emotions such as sadness, fear, or happiness. The permeations permitted by the invention are virtually endless.

Use of the tool 20 as a diagnostic tool is similar to use as an educational tool, with the instructor beginning the test with selected sorting cards 32 bearing characters which are easily matchable with and distinguishable from that borne by the target or target card 28. The test progresses with the replacement of the target 28 and/or sorting cards 32 with those bearing characters which are progressively more difficult to match and differentiate. Careful use of the tool 20 in this manner can provide quantitative information regarding the extent to which a student possesses matching, classifying, or labeling skills. Furthermore, it is possible to determine precisely the point at which the student's ability to perform this task breaks down. These factors help the instructor to place the student at the proper developmental level and/or to suggest appropriate remedial techniques.

In use as a toy, the tool 20 can be provided to children for free (partially or completely unsupervised) play. If desired, the parent or instructor can provide only a selected target or target card 28 and an assortment of sorting cards 32 to assure success and to reduce the possibility of frustration. Use of the tool 20 in this manner serves to reenforce earlier guided learning and provides enjoyable practice. In this instance, the transparent plastic pocket 30 allows the child to review work, spot errors, and correct himself or herself unsupervised. Such unsupervised use also provides an early experience in making choices and in making and correcting mistakes. This provides an invaluable independent learning experience and helps to further foster independence.

Whether used as a diagnostic tool, an educational tool, or a game or toy, the tool 20 offers a number of advantages over other existing products. For instance, by requiring simple physical manipulation, the tool 20 offers a distinct advantage to the special needs population over other known tools which require the students to verbalize their identification of the object or concept being mastered or categorized. In addition, the combination of the transparent pockets 30 and the targets 28 offers children an instantaneous and definitive result to their matching, classifying, or labeling efforts because the children can tell immediately after insertion whether or not they have correctly matched the character 48 on the sorting card 32 to the character 46 on target 28. This provides a clear-cut result to each classification decision and reduces the possibility of frustration, particularly for very active students. The tool 20 also encourages independent learning because it is exceedingly simple to use, yet tasks ranging from simple to complex may be set up by replacing the targets 28 and card 32. As a result, virtually any students can use the tool 20 independently at levels approaching their current thresholds. The use of the replaceable target or targrt card 28 and replaceable sorting cards 32 thus assures that the students will not "grow out" of the tool 20 quickly and at the same time assures that difficulty levels do not exceed the students' level of skill. Finally, the sturdiness and rigidity of the panel 24, target 28, pocket 30, and sorting cards 32 render the tool less susceptible to damage when used by children of low dexterity or when used by children who exceed their frustration thresholds and who strike or otherwise mishandle the tool 20. This permits more unsupervised use of the tool and further fosters independence.

The tool 20 having a one-panel board 22 as thus far described serves as a simple and convenient device for evaluating and/or enhancing a student's matching, labeling, or classifying skills. The effectiveness of such a tool is, however, inherently limited by the fact that a student need only evaluate one target 28 at a time. Every sorting card 32 either matches this target 28 or it does not. It may often be desirable to require the student to match more than one target at a time, particularly to enhance the student's classifying skills. This can best be done through the use of multiple work areas each including a different target. Several embodiments of boards employing such multiple work areas will now be described.

4. Construction and Operation of Multiple Work Area Boards

Referring now to FIGS. 4–11, tools constructed in accordance with several different embodiments of the invention are illustrated. The tools of all embodiments are constructed from the same basic materials and operate in essentially the same manner as the tool 20 of the embodiment of FIG. 1. Elements of each successive embodiment corresponding to those of the embodiment of FIG. 1 are thus designated by the same reference numerals, incremented by 100 for each successive embodiment. For example, the boards of the second, third, and fourth embodiments are designated by 120, 220, and 320, respectively.

Figure 5:
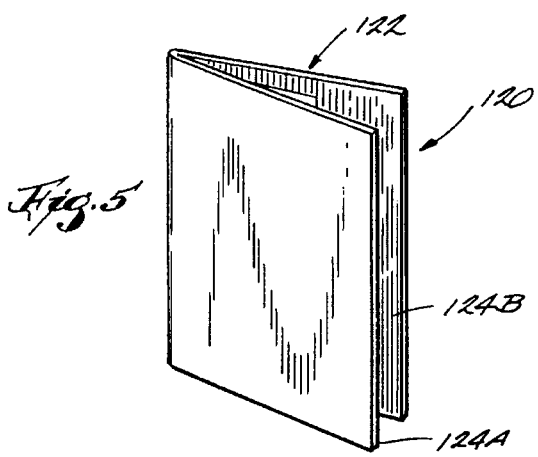
FIG. 5 is a perspective view corresponding to FIG. 4 but illustrating one panel of the tool folded over the other.

Referring to FIGS. 4 and 5, a tool 120 constructed in accordance with a second embodiment of the invention is illustrated which is formed from a two-panel board 122. The panels 124A, 124B are preferably formed integral with one another and joined at a hinge 125 formed from a reduced thickness area of the board 122. The hinge 125 permits the panels 124A, 124B to be folded one on top of the other as illustrated in FIG. 5 or one beneath the other for reasons discussed below.

Each panel 124A, 124B of board 122 presents on its front face 126A, 126B a single work area. The work area of each panel 124A, 124B is of identical construction to that described above in connection with the first embodiment and includes (1) a target or target card 128A, 128B detachably mounted on the respective panel 124A, 124B by hook-and-loop fasteners or the like, and (2) a transparent pocket 130A, 130B located beneath the associated target 128A, 182B.

In use, targets 128A, 128B bearing different characters 146A, 146B are mounted on the panels 124A, 124B, and the user is given a stack (not shown) of sorting cards 132A, 132B some of which bear characters 148A, 148B matching those borne by the targets 128A, 128B and some of which may bear characters which match neither target 128A nor target 128B. The user then sorts through the sorting cards 132A, 132B and inserts in each pocket 130A, 130B the cards bearing characters matching that of the corresponding target 128A, 128B. This thus requires the user to evaluate each sorting card 132A, 132B against two separate targets 128A, 128B, thereby enhancing the user's classifying skills.

When not in use or at the end of use, the panels 124A, 124B preferably can be folded together at the hinge 125 as illustrated in FIG. 5 for storage. This also covers the targets 128A, 128B and pocket 130A, 130B and thus prevents the board 122 from distracting students involved in other tasks. The foldable multi-panel board 122 also permits the instructor to vary the number of matching operations by folding the board 122 over backwards so that only one of the panels 124A or 124B and its associated target 128A or 128B is visible to the user.

Figure 6:
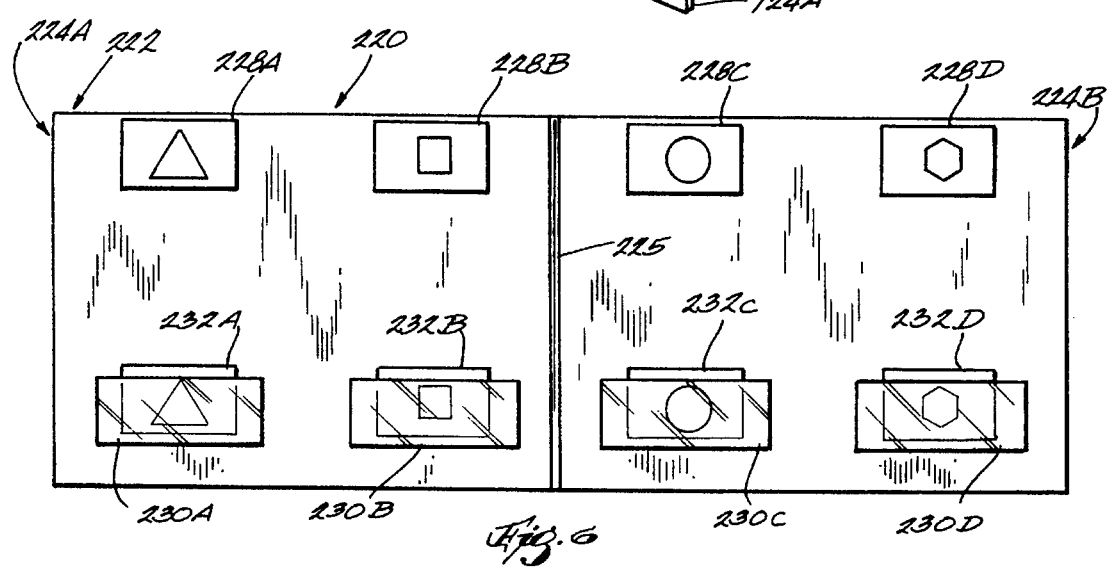
FIG. 6 is a front plan view of a two-panel/four-work area tool exemplifying a third embodiment of the invention.
Figure 10:
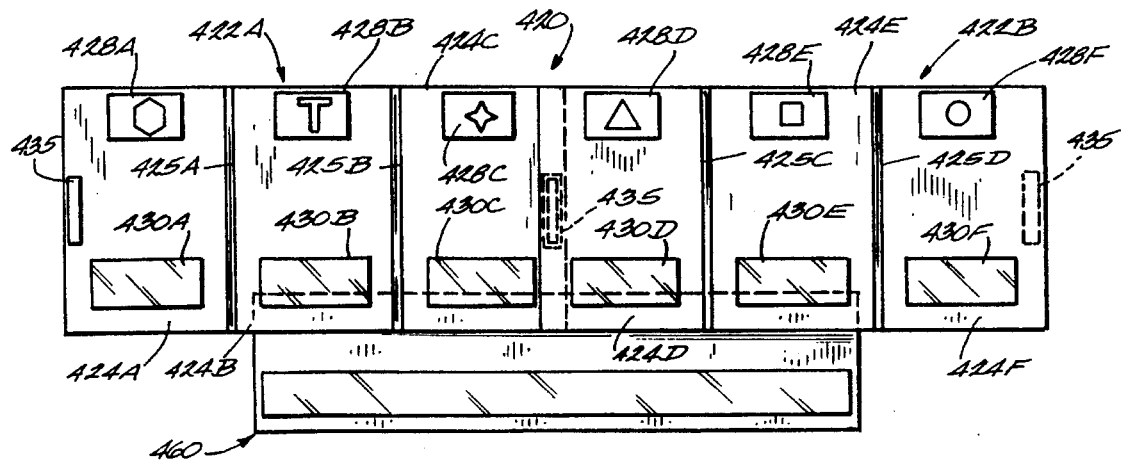
FIG. 10 is a front plan view of a tool constructed in accordance with a fifth embodiment of the invention and formed from two boards constructed in accordance with the embodiment of FIG. 7 and strung end to end.

All boards described above employ a single work area per panel. It is, of course, possible to present multiple work areas on each panel as illustrated in FIG. 6 which illustrates a tool 220 constructed in accordance with a third embodiment of the invention. Tool 220 has a two-panel board 222 which is identical to that of FIGS. 4 and 5 but which presents two work areas on each panel 224A, 224B with each work area receiving a separate target 228A–228D and a separate pocket 230A–230D for receiving cards 232A–232D. The tool 220 can thus be closed, used as a two-work area board, or used as a four-work area board depending on the manner in which board 222 is folded.

Referring now to FIGS. 7–9, a tool 320 constructed in accordance with a fourth embodiment of the invention is illustrated. Tool 320 comprises a board 322 formed from three panels 324A–324C the front face 326A, 326B, or 326C of each of which presents a separate work area on which is mounted a respective target 328A–328C and a respective pocket 330A–330C. Pockets 330A–330C receive sorting cards 332A–332C bearing characters 348A–348C matching the characters 346A–346C on the target cards 328A–328C. As in the previous embodiment, the rigid plastic panels 324A–324 C are joined at hinges 325A, 325B preferably formed from reduced thickness portions of the board 322.

A three-panel board 322 such as that illustrated in FIGS. 7–9 requires even greater classification skills than required by a two-panel board and thus is usable by more advanced students. Less advanced students may use the same board simply by folding one of the edge panels 324A or 324B backwards under the board 322 to produce in effect a two-panel board, or by folding one of the edge panels 324A or 324C forwardly over the center panel 324B to produce in effect a one-panel board.

The embodiment of FIGS. 7–9 also illustrates a convenient storage device 360 for storing the assortment cards 332A–332C. The illustrated device takes the form of a pliable panel 362 supporting a transparent pocket 364 and detachably connectable to the board 322 by a hook-and-loop fastener 366 located on the front surface thereof and a mating hook-and-loop fastener 368 positioned on the lower portion of the rear surface of the board 322. FIG. 8, like FIG. 2, also illustrates that additional fasteners 334 can be provided on the back of the board 322 for mounting the board 322 on a wall, table, or other support bearing mating fasteners. Fasteners 335 at the edges of the board 322 also permit the board to be secured into its folded position.

The mounting of hook-and-loop fasteners or the like on the side edge portions of a single or multi-paneled board also permits the stringing together of more than one board for more complex categorizing tasks. Thus, referring to FIG. 10, a tool 420 is illustrated which is constructed in accordance with a fifth embodiment of the invention and in which two three-panel boards 422A, 422B of the type illustrated in FIGS. 7–9 may be attached to one another using the side edge fasteners 435. Targets 428A–428F bearing different characters be provided in the work areas of each of the six panels 424A–424F and are aligned with associated pockets 430A–430F, thus presenting significantly more complex matching, labeling, or classifying tasks. The tasks can be simplified by folding one or both of the boards 422A, 422B along one or more of the hinges 425A–425D. As in the previous embodiments, tool 420 may be handheld or supported on a table or may be mounted on a wall, in which case it could receive an enlarged storage device 460 as illustrated.

Figure 11:
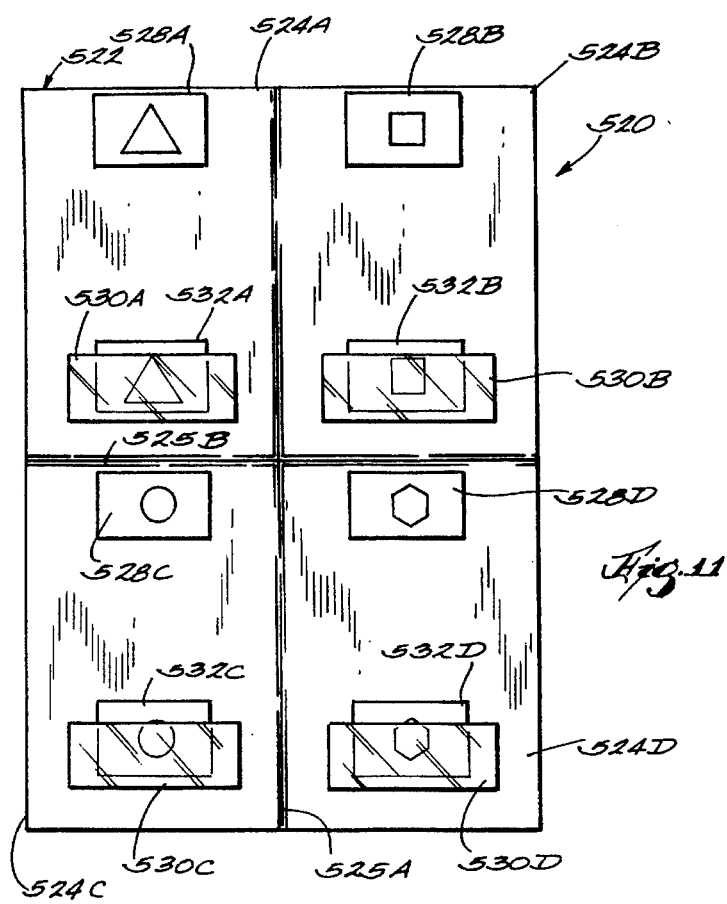
FIG. 11 is a front plan view of a four-panel/four-work area tool exemplifying a sixth embodiment of the invention.

Finally, it should be noted that it is not necessary to arrange work areas in a single row. Work areas can be arranged in both rows and columns either on a single panel or on multiple panels. Thus, as illustrated in FIG. 11, a tool 520 may be provided in accordance with a sixth embodiment of the invention, the board 522 of which has four panels 524A–524D arranged in a two-by-two matrix. Each panel 524A–524D presents its own work area composed of a target or target card 528A–528D and a pocket 530A–530D for receiving a sorting card 532A–532D. Vertical and horizontal hinges 525A, 525B, formed from reduced thickness areas of the board 522, are preferably provided between the left panels 524A, 524C and right panels 524B, 524B and between the upper panels 524A, 524B and lower panels 524C, 524D, respectively, so as to permit vertical and/or horizontal folding of the board 522 both to permit selective reduction of the complexity of the categorizing task and for storage.

The instructional tool of each of the six embodiments described above facilitates evaluation and/or enhancement of a student's matching, labeling, and/or classifying skills without requiring verbalization while at the same time fostering a student's independence and reducing his or her frustration threshold. The above examples are merely intended to be illustrative of ways in which the invention can be carried out and should not be construed to be exhaustive. Many changes and modifications could be made to the invention without departing from the spirit thereof. The scope of such changes will become apparent from the appended claims.

I claim:

1. An instructional or diagnostic tool comprising:
   (A) a board comprising a panel, said panel having a front face presenting a work area;
   (B) a target card bearing a character;
   (C) a device via which said target card is removably and selectively mounted on a first designated portion of said work area; and
   (D) a transparent pocket, mounted on a second designated portion of said work area, for receiving sorting cards bearing characters which match the character borne by said target card.

2. A tool as defined in claim 1, wherein said panel is formed from a sturdy, durable material.

3. A tool as defined in claim 2, wherein said panel is formed from a rigid plastic.

4. A instructional or diagnostic tool comprising:
   (A) a board comprising a panel, said panel having a front face presenting a work area;
   (B) a target card bearing a character;
   (C) a device via which said target card is removably and selectively mounted on a first designated portion of said work area, wherein said device comprises a fastener having a first portion mounted on a rear portion of said target card and second, mating portion mounted on said first designated portion of said work area; and (D) a pocket, mounted on a second designated portion of said work area, for receiving sorting cards bearing characters which match the character borne by said target card.

5. A tool as defined in claim 4, wherein said fastener comprises a hook-and-loop fastener.

6. A instructional or diagnostic tool comprising;

(A) a board comprising a panel, said panel having a front face presenting a work area;

(B) a target card bearing a character;

(C) a device via which said target card is removably and selectively mounted on a first designated portion of said work area;

(D) a pocket, mounted on a second designated portion of said work area, for receiving sorting cards bearing characters which match the character borne by said target card; and (E) a connector which is mounted on a back face of said panel and which is capable of connecting said panel to at least one of (1) a support, and (2) another panel.

7. An instructional or diagnostic tool, comprising:

(A) a board including a panel formed from a sturdy, durable material, said panel having a front face presenting a work area;

(B) a target card bearing a character;

(C) a device via which said target card is removably and selectively mounted on a first designated portion of said work area;

(D) a transparent pocket mounted on a second designated portion of said work area; and (E) a plurality of sorting cards dimensioned to fit in said pocket, some of said sorting cards bearing characters matching the character borne by said target card.

8. A tool as defined in claim 7, wherein said panel is formed from a rigid plastic.

9. A tool as defined in claim 7, further comprising fasteners, mounted on a rear face of said board, for mounting said board on a support.

10. A tool as defined in claim 7, further comprising a storage device, attached to said panel, for storing said cards prior to use.

11. A tool as defined in claim 10, wherein said storage device comprises a pocket.

12. A tool as defined in claim 7, wherein said work area comprises a first work area, and wherein said front face of said panel presents a second work area, and further comprising (A) a second target card bearing a second character different from that borne by the target card mounted on said first designated portion of said first work area (B) a second device via which second target card is removably and selectively mounted on a first designated portion of said second work area; and (C) a second transparent pocket mounted on a second designated portion of said second work area; and wherein others of said sorting cards are dimensioned to fit in said second pocket and bear characters matching said second character.

13. A tool as defined in claim 7, wherein said board comprises a first board and said work area comprises a first work area, and further comprising (A) a second board detachably connected to said first board, said second board having a front face which is generally co-planar with said front face of said first panel and which presents a second work area, (B) a second target card bearing a second character different from that borne by the target card mounted on said first designated portion of said first work area;

(C) a second device via which said second target card is removably and selectively mounted on a first designated portion of said second work area; and (D) a second transparent pocket mounted on a second designated portion of said second work area; and wherein others of said sorting cards bear characters matching said second character and are dimensioned to fit in said second pocket.

14. A tool as defined in claim 7, wherein said device comprises a hook-and-loop-fastener.

15. An instructional or diagnostic tool, comprising:

(A) a board including a panel formed from a sturdy, durable material, said panel having a front face presenting a work area;

(B) a target detachably mounted on said work area, said target bearing a character;

(C) a transparent pocket mounted on said work area; and (D) a plurality of cards dimensioned to fit in said pocket, some of said cards bearing characters matching the character borne by said target, wherein said target is mounted on said panel by hook-and-loop fasteners.

16. An instructional or diagnostic tool,. comprising:

(A) a board including a panel formed from a sturdy, durable material, said panel having a front face presenting a work area;

(B) a target detachably mounted on said work area, said target bearing a character;

(C) a transparent pocket mounted on said work area;

(D) a plurality of cards dimensioned to fit in said pocket, some of said cards bearing characters matching the character borne by said target; and (E) a storage device, attached to said panel, for storing said sorting cards prior to use, wherein said storage device is detachably connected to said panel.

17. An instructional or diagnostic tool, comprising:

(A) a board including a panel formed from a sturdy, durable material, said panel having a front face presenting a work area;

(B) a target detachably mounted on said work area, said target bearing a character;

(C) a transparent pocket mounted on said work area; and (D) a plurality of cards dimensioned to fit said pocket, some of said cards bearing characters matching the character borne by said target, wherein said panel comprises a first panel and said work area comprises a first work area, and wherein said board comprises a second panel hingedly connected to said first panel, thereby creating a foldable two-panel board, said second panel having a front face which is generally co-planar with said front face of said first panel when said board is in an unfolded condition and which presents a second work area, and further comprising (E) a second target detachably mounted on said second work area, said second target bearing a second character different from that borne by the target mounted on said first work area; and (F) a second transparent pocket mounted on said second work area; and wherein others of said cards bear characters matching said second character and are dimensioned to fit in said second pocket.

18. A tool as defined in claim 17, wherein said board further comprises a third panel hingedly connected to said first panel, thereby creating a foldable three-panel board, said third panel (1) having a front face which is generally co-planar with said front face of said first panel when said board is in an unfolded condition and (2) presenting a third work area, and further comprising (A) a third target detachably mounted on said third work area, said third target bearing a third character different from those borne by the targets mounted on said first and second work areas; and (B) a third transparent pocket mounted on said third work; and wherein others of said cards bear characters matching said third character and are dimensioned to fit in said third pocket.

19. A tool as defined in claim 17, wherein said board further comprises third and fourth panels hingedly connected to said first and second panels, thereby creating a foldable four-panel board, said third and fourth panels having front faces which are generally co-planar with said front faces of said first and second panels when said board is in an unfolded condition and which present third and fourth work areas, respectively, and further comprising (A) third and fourth targets detachably mounted on said third and fourth work areas, respectively, each of said third and fourth targets bearing a character different from those borne by the targets mounted on said first and second work areas; and (B) third and fourth transparent pockets mounted on said third and fourth work areas, respectively; and wherein others of said cards bear characters matching said third and fourth characters and are dimensioned to fit in said third and fourth pockets.

20. An instructional or diagnostic tool comprising (A) a board having at least two stiff, durable panels connected to one another so as to permit folding of said board, each of said panels presenting at least one work area on a front face thereof;

(B) at least two target cards, each said target card bearing a distinct character;

(C) at least two devices, each of which removably and selectively mounts a respective one of said target cards on a first designated portion of said work area;

(D) at least two transparent pockets, one of which is mounted on a second designated portion of each said work area; and (E) a plurality of sorting cards, each of which bears a character matching that borne by one of said targets and each of which is dimensioned to fit in at least one of said pockets.

21. A tool as defined in claim 20, wherein each of said devices comprises a hook-and-loop fastener.

22. A tool as defined in claim 20, wherein said panels are joined to one another by a hinge.

* * * * *